June 21, 1932.  O. STEINER  1,864,100
FILM GUIDE FOR PHOTOGRAPHIC CAMERAS
Filed April 10, 1931  2 Sheets-Sheet 2
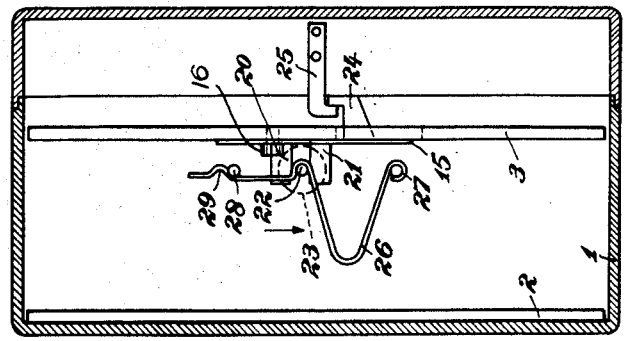
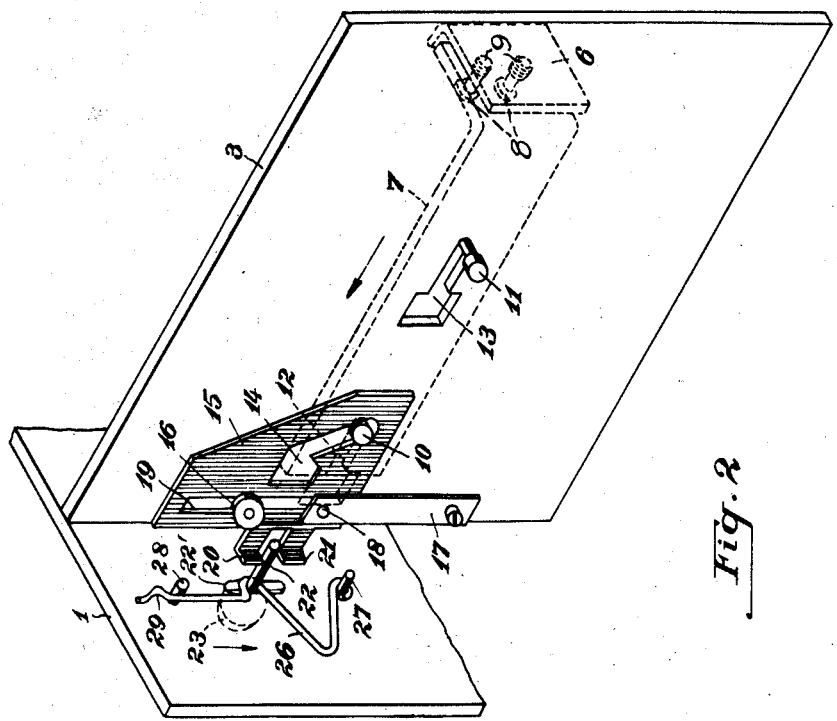
Inventor:
Otto Steiner
by
Attorneys Patented June 21, 1932

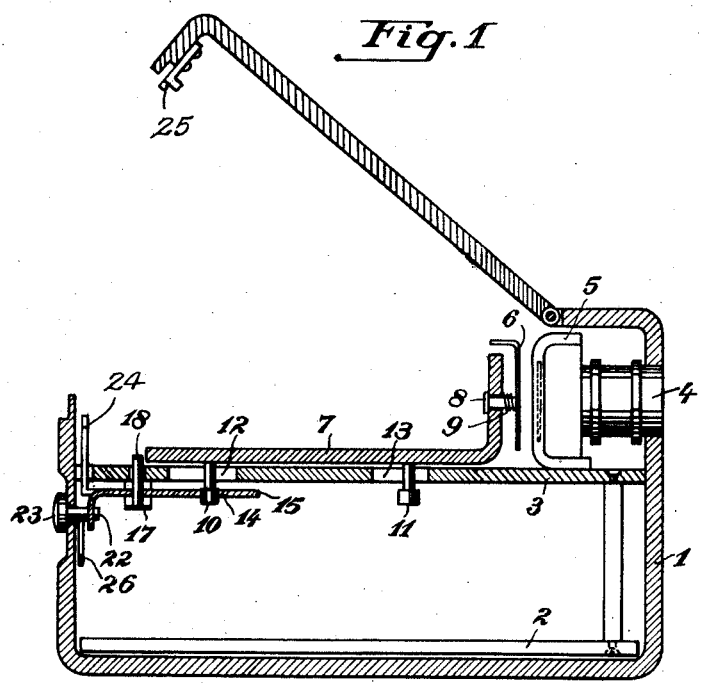

1,864,100

UNITED STATES PATENT OFFICE

OTTO STEINER, OF BERLIN-SPANDAU, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

FILM GUIDE FOR PHOTOGRAPHIC CAMERAS

Application filed April 10, 1931, Serial No. 528,897, and in Germany August 15, 1930.

My present invention relates to photographic film cameras, and particularly to means for facilitating the insertion and removal of the film. In cameras of this type, a film guide is employed in connection with a presser plate, and in certain earlier constructions, the presser plate of the film channel has been operated directly by a pin secured to the cover of the camera casing. These constructions, however, require very accurate setting of the pin in order that a constant pressure of the desired magnitude may be exerted on the presser plate. This adjustment or setting is rendered particularly difficult because the device for pressing the movable member of the film guide must be relatively weak, owing to the small space available; thus after a short time of use, correction of the adjustment, or resetting, is required.

According to my invention these drawbacks are avoided by using suitable intermediate elements in the mechanism for opening the film channel by means controlled by the locking device of the cover. Preferably the mechanism for opening the film channel is connected operatively with the locking member of the cover, which member is located on the stationary part of the camera casing, in such a manner that movement of the locking member to the open or the closed (locking) position will bring the film channel to the like position. This presents the important advantage that all parts of the film-guiding channel may be adjusted independently of the camera casing or its cover, and furthermore, the presser plate or equivalent member will be urged with a constant force toward the abutment connected with the objective. This form of my invention is especially valuable in connection with cameras in which the film is fed exclusively by a gripper or claw and a take-up reel, by friction, without any preliminary or supplemental reel; in this case the effective frictional forces in the film channel and at the take-up reel are properly proportioned to each other and therefore require a uniform pressure at the presser plate of the film-guiding channel.

Details of my invention will now be described more fully in connection with the accompanying drawings which show a typical and satisfactory embodiment of the invention.

Fig. 1 is a cross section of the camera, in a plane parallel to the optical axis, with the cover open; Fig. 2 is a detail perspective view showing a partition of the camera casing and its connection with the mechanism for opening the film channel; and Fig. 3 is an inside view of the rear wall of the camera, to which wall the locking member is secured, the camera casing being shown in section and certain parts being omitted for the sake of clearness.

The camera casing 1 contains two metal frame plates 2 and 3 between which is located the spring motor (not shown) for operating the film-feeding mechanism. On the side of the plate 3 opposite to the plate 2 is the film-compartment with the objective 4, secured to the plate or partition 3 by a U-shaped carrier 5. This carrier is provided with the customary opening or film-gate and at the same time forms the abutment surface against which the film is pressed by the presser plate 6 of the film guide or channel. This plate is secured yieldingly to the laterally bent end of a bar 7. This plate 6 carries a pin 8 extending loosely through an opening in said bent end of the bar 7, and adapted to slide lengthwise of the body of bar 7. A coiled spring 9 surrounds the pin 8 between the plate 6 and the bent end of bar 7, and tends to press said plate toward the carrier or abutment 5, so as to afford proper guidance for the film as it passes between the parts 5, 6. The bar 7 is movable in the direction of its length, being guided by means of headed studs or pins 10 and 11 which extend through, and are slidable in, keyhole slots 12 and 13 respectively of the plate or partition 3. The pin 10 at its free end extends into an angular slot 14 on a sheet metal plate or slide 15 which is movable on the partition 3 in a direction transverse to the movement of the bar 7. For this purpose, a pin 16 carried by the partition 3 and a pin 18 carried by the free end of a spring tongue 17 secured to said partition, extend into a slot 19 of the plate 15, said slot being transverse to the slots 12 and 13. The slot 14 of the plate 15 has a portion oblique with reference to the directions of the slots 12, 13, and 19. The plate 15 is provided at one side with a forked lug the bent ends 20 and 21 of which are on opposite sides of a pin or shank 22 connected with the knob 23 serving for opening or closing the locking device of the cover. The shank 22 is movable in a slot 22' of the casing 1, said slot being parallel to the slot 19. The locking device consists of a hook 24 bent laterally from the plate 15 and a companion hook 25 secured to the cover (Fig. 3). A spring 26 secured to a wall of the camera casing by a pin 27, is bent around the pin or shank 22 of the knob 23. Near its free end, the spring 26 engages a pin 28 on the camera casing, and beyond the pin 28 the spring 26 has a bend or hump 29.

The operation is as follows: When it is desired to open the camera casing, the knob 23 and its shank 22 are shifted in the direction indicated by the arrow in Fig. 2. The shank 22, since it is embraced by the ends 20, 21 of the forked lug on the plate 15, will take the said plate along in the same direction, since the slots 19 and 22' are parallel. The inclined portion of the slot 14, by its action on the pin 10 of the bar 7, will cause said bar to be moved lengthwise, as indicated by the arrow in Fig. 2, in a direction to carry the presser plate 6 away from the abutment 5. At the same time, the movement of the plate 15 has carried its hook 24 out of engagement with the hook 25 on the cover, so that the latter can be opened to permit inserting or removing a film. The motion of the bar 7 depends on the inclination of the slot 14, and the movement of said bar in the direction just referred to is limited by the end of the pin 18, which, as shown in Fig. 1, normally projects into the path of the bar 7.

When the knob 23 is moved in the direction stated, to open the casing, the portion of the spring 26 between the pins 22 and 27 is bent and put under tension, and the bend 29 which originally was beyond or above the pin 28 passes to the opposite side of said pin (below it), acting as a latch to hold the knob in the opening position. The tension of the spring 26 will assist or facilitate the movement of the knob 23 in the opposite (closing) direction.

When closing the apparatus, the parts will be moved in the opposite direction, the plate 15 acting to shift the bar 7 toward the abutment 5, the presser plate 6 engaging the abutment toward the end of such movement, and any further slight movement of the bar 7 leaves the position of the plate 6 unaffected, the spring 9 yielding to the required extent. The final position of the bar 7 is determined substantially by the length of the slot 14 as well as by the slot 19 and the pins 16 and 18 extending therethrough. Since the instrumentalities limiting the movement of the plate 15 and therefore of the plate 7, are mounted exclusively on the partition 3, the pressure with which the plate 6 bears against the abutment 5 is to a large extent independent of the position of the knob 23, so that even if elements of the mechanism should become bent, so as to alter the stroke or throw of the knob 23, this will have no influence on the pressure holding the members 5, 6 together. Therefore, with my invention adjustment of such contact pressure can be effected readily, together with the parts mounted on the partition 3, when the camera is in the open position.

My improved construction also permits the bar 7 to be removed in a very simple manner, for instance when it is desired to remove any dust that may have settled under said bar. For this purpose, the camera having been opened, the pin 18 carried by the spring arm 17 is pressed manually into or through the partition 3, until such pin clears the path of the bar 7, leaving the latter free to be moved beyond said pin. This extra movement will bring the heads of the pins 10 and 11 into the enlarged end portions of the slots 12, 13, and 14, so that the bar 7 may be removed laterally. Such lateral movement is assisted by the pressure which the spring 17, through the end of the pin 18, exerts on the bar 7, since at such time the end of said pin engages the body of said bar.

Various modifications may be made without departing from the nature of my invention as defined in the appended claims.

I claim:

1. A film camera having a casing provided with a cover, said camera including a film guide provided with a movable member, means for locking the cover, and an operative connection between said locking means and the movable member of the film guide.

2. A film camera according to claim 1, in which the said operative connection is of such character that the pressure exerted by the movable member of the film guide is substantially independent of the forces which at the closing of the cover are exerted upon the latter or its locking means.

3. A film camera according to claim 1, in which the movable member of the film guide is operated by a slide movable transversely of the path of said member.

4. A film camera according to claim 1, in which the movable member of the film guide is mounted movably on a sliding bar and is spring-pressed relatively to said bar in the direction in which the bar moves.

5. A film camera according to claim 1, provided with a partition, the movable member of the film guide being carried by a sliding bar having projections guided in said partition, and a slide operated by the locking means of the cover and engaging one of said projections to shift said bar.

6. A film camera according to claim 1, in which the movable member of the film guide is carried by a sliding bar, and in which said sliding bar is operated by a slide movable, transversely of the path of the bar, on pins one of which forms a stop for said bar.

7. A film camera according to claim 1, in which the movable member of the film guide is carried by a sliding bar, and in which said sliding bar is operated by a slide movable, transversely of the path of the bar, on pins one of which is spring-pressed to project normally into the path of said bar and form a stop therefor, while by pressing said pin in opposition to the spring action the pin may be made to clear the path of said bar.

8. A film camera according to claim 1, in which the movable member of the film guide is carried by a sliding bar, and in which said sliding bar is operated by a slide movable, transversely of the path of the bar, on pins one of which is normally in the path of said bar to form a stop therefor, but is movable transversely of said path so that such pin may be shifted to a position in which it clears said path and releases said sliding bar.

9. A film camera according to claim 1, in which the movable member of the film guide is operated by a slide movable transversely of the path of said member, and in which the means for locking the cover is carried by said transversely movable slide.

In testimony whereof I affix my signature.

OTTO STEINER.